United States Patent
Modi et al.

(10) Patent No.: US 6,841,590 B2
(45) Date of Patent: Jan. 11, 2005

(54) HOT MELT FLEXOGRAPHIC INKS AND METHOD OF PREPARING SAME

(75) Inventors: Jitendra Modi, Wallington, NJ (US); Edward Stone, Morris Plains, NJ (US); Ana Marie Flores, Jersey City, NJ (US); Robert Catena, Belleville, NJ (US); Robert Auerbach, Princeton, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 267 days.

(21) Appl. No.: 10/034,004

(22) Filed: Dec. 28, 2001

(65) Prior Publication Data

US 2003/0149134 A1 Aug. 7, 2003

(51) Int. Cl.$^7$ .................. C09D 11/10; C08L 31/04; C08L 33/02; C08L 91/06
(52) U.S. Cl. ............ 523/160; 524/275; 524/487; 524/489; 524/556; 524/563
(58) Field of Search ................ 523/160, 161; 106/31.61; 524/275, 487, 489, 556, 563

(56) References Cited

U.S. PATENT DOCUMENTS

| | | | |
|---|---|---|---|
| 4,066,585 A | | 1/1978 | Schepp et al. ............ 260/18 N |
| 4,280,939 A | * | 7/1981 | Johnson ...................... 523/160 |
| 4,853,427 A | * | 8/1989 | Herten et al. ................ 524/394 |
| 4,865,913 A | * | 9/1989 | Takeuchi et al. .......... 428/32.62 |
| 4,889,560 A | * | 12/1989 | Jaeger et al. ............ 106/31.29 |
| 4,946,508 A | | 8/1990 | Schwartz et al. ........... 106/496 |
| 4,946,509 A | | 8/1990 | Schwartz et al. ........... 106/496 |
| 5,024,894 A | | 6/1991 | Chien ........................ 428/433 |
| 5,062,894 A | | 11/1991 | Schwartz et al. ............ 106/23 |
| 5,112,398 A | * | 5/1992 | Kruse ..................... 106/31.27 |
| 5,560,765 A | * | 10/1996 | Sawada ..................... 106/31.3 |
| 5,574,078 A | * | 11/1996 | Elwakil ...................... 523/161 |
| 5,593,486 A | * | 1/1997 | Oliver et al. ................. 524/96 |
| 6,106,602 A | * | 8/2000 | Ouchi et al. ............. 106/31.61 |
| 6,283,031 B1 | * | 9/2001 | Kakuta et al. .............. 101/466 |
| 6,645,282 B2 | * | 11/2003 | Stone et al. ............ 106/31.28 |
| 2003/0108689 A1 | * | 6/2003 | Tan et al. ..................... 428/29 |

OTHER PUBLICATIONS

Ethylene Homopolymers–Polywax [online]. Baker Hughes Corporation, 2003. Retrieved from the Internet: <URL: www.bakerhughes.com/bakerpetrolite/polymers/ethylene_homopolymers>.*

* cited by examiner

*Primary Examiner*—Callie Shosho
(74) *Attorney, Agent, or Firm*—Sidney Persley

(57) ABSTRACT

Solid, solvent-free inks are provided for use in hot melt flexographic printing. The ink is composed of a pigment; a thermoplastic binder which is an ethylene copolymer, a hydrocarbon resin, or a combination thereof; a wax which is a highly branched hydrocarbon wax, a polyethylene homopolymer wax, an oxidized polyethylene wax, an animal wax, a vegetable wax or combinations thereof; a solid linear alcohol; and, a dispersing agent. The ink may also contain a solid plasticizer. The solid ink has a melting point of about 75° C. or greater, and when heated to a temperature between about 90° C. and about 135° C., a molten ink is formed which has a viscosity between about 100 cps and about 1200 cps. The solid inks are used in melt flexographic printing by heating the ink to a temperature greater than about 90° C. to form a molten ink which has a viscosity between about 100 cps and about 1200 cps; applying the molten ink to the surface of a heated anilox roller in operational contact with a heated flexographic printing plate; and printing the applied molten ink from the printing plate onto a substrate such as conventional print stock, polymeric films, metal sheets, etc.

35 Claims, No Drawings

HOT MELT FLEXOGRAPHIC INKS AND METHOD OF PREPARING SAME

BACKGROUND OF THE INVENTION

1. Field of the Invention

This invention relates to inks for use in flexographic printing. More particularly, this invention relates to solvent-free, solid inks for use in hot melt flexographic printing presses.

2. Description of Related Art

Conventional flexographic printing inks typically require organic solvents or water for their application. The use of solvents is well known to be linked with a variety of disadvantages, both for the manufacturer as well as the printer, for example the danger of fire, explosion, odor, and environmental pollution. Such inks, in addition to these disadvantages, also lead to a lessening of the printing quality due to residual solvent, for example a decrease in the blocking temperature. Also, only certain maximum printing speeds can be achieved which are determined by the rate of evaporation of the solvent or water employed, and which cannot be sufficiently increased by printing press construction.

The problems of environmental pollution by solvents have led to the development of solvent-free printing inks which contain reactive components which are hardened at elevated temperatures or by incident radiation. In particular, reactive monomers and/or oligomers have been used as vehicles for printing inks. Such reactive inks when printed are hardened on a substrate by heat, ultraviolet light or electron radiation in a very short time to form a film. While such solvent-free inks have eliminated pollution by solvents the hardened printed inks frequently contain residual unreacted monomers which can lead to contamination in such applications as food packaging.

Hot melt inks have been under development for several years. Illustrative of such development are the gravure and flexographic printing processes employing solvent-free inks, solid at room temperature but molten at printing temperatures, which have been disclosed in U.S. Pat. No. 4,066,585. The disclosed solid inks comprise a pigment and a thermoplastic binder having a softening point between 90° C. and 160° C. The binder comprises a synthetic polyamide resin or synthetic polyesteramide resin, each resin being the condensation product of (1) an acid component comprising a dimerized fatty acid and a monocarboxylic acid and (2) an amine component comprising a diamine and, in the case of the polyesteramide resin, additionally comprising a diol and/or alkanolamine.

While advances have been made in hot melt ink technology, there remain major problems with its efficient use in the industry. One such problem confronting this technology in gravure printing is the remelting of inks in succeeding print stations. In gravure printing, the previously printed ink comes in contact with the non-image area of the cylinder of the next print station; thus, allowing transfer to occur if the temperature of the cylinder and press speed are such to allow the ink to melt. Flexographic printing overcomes the remelting problem because ink is transferred to the paper/substrate from raised image rather than from an etched gravure cell. In the flexographic printing process, ink on the print from the previous station therefore does not come in contact with the non-image area of the plate. Another problem confronting this technology is the elimination of volatile components, particularly at the high temperatures used on printing press. In view of the present state of the technology, there continues to be an industry need for hot melt inks that can be used with flexographic printing plates to produce high quality printing on various substrates.

SUMMARY OF THE INVENTION

These needs are met by the solid inks of this invention which is a solvent-free, flexographic printing ink which is solid at room temperature, the ink consisting essentially of:
(A) a pigment;
(B) a thermoplastic binder selected from the group consisting of an ethylene copolymer, a hydrocarbon resin, and a combination thereof;
(C) a wax selected from the group consisting of a highly branched hydrocarbon wax, a polyethylene homopolymer wax, an oxidized polyethylene wax, an animal wax, a vegetable wax and combinations thereof;
(D) a solid linear alcohol at room temperature; and,
(E) a dispersing agent; and, optionally,
(F) a solid plasticizer;
wherein, the ink has a melting point of about 75° C. or greater, and when heated to a temperature between about 90° C. and about 135° C., forms a molten ink which has a viscosity between about 100 cps and about 1200 cps. Preferably, the molten ink has a viscosity between about 100 cps and about 700 cps.

An added embodiment of this invention is a method of melt flexographic printing comprising:
(I) providing an ink which is solid at room temperature, the ink consisting essentially of:
  (A) a pigment;
  (B) a thermoplastic binder selected from the group consisting of an ethylene copolymer, a hydrocarbon resin, and a combination thereof;
  (C) a wax selected from the group consisting of a highly branched hydrocarbon wax, a polyethylene homopolymer wax, an oxidized polyethylene wax, an animal wax, a vegetable wax and combinations thereof;
  (D) a solid linear alcohol at room temperature; and,
  (E) a dispersing agent; and, optionally,
  (F) a solid plasticizer;
(II) heating the ink to a temperature between about 90° C. and about 135° C. to form a molten ink which has a viscosity between about 100 cps and about 1200 cps;
(III) applying the molten ink to a heated anilox roller in operational contact with a surface of a heated flexographic printing plate; and
(IV) printing the applied molten ink onto a substrate.

A further embodiment of this invention is a method for preparing a flexographic printing ink for hot melt flexographic printing comprising:
(I) preparing a molten pigment dispersion from a component mixture in a mixer/grinder which is heated to a temperature above the melting point of the component mixture, wherein the component mixture consists essentially of:
  (A) a pigment;
  (B) a solid linear alcohol at room temperature; and,
  (C) a dispersing agent; and, optionally,
  (D) a solid plasticizer;
(II) preparing a molten varnish from a second component mixture in a second mixer which is heated to a temperature above the melting point of the second component mixture, wherein the second component mixture consists essentially of:
  (E) a thermoplastic binder selected from the group consisting of an ethylene copolymer, a hydrocarbon resin, and a combination thereof; and, (F) a wax selected from the group consisting of a highly branched hydrocarbon wax, a polyethylene homopolymer wax, an oxidized polyethylene wax, an animal wax, a vegetable wax and combinations thereof; and (III) adding the pigment dispersion to the molten varnish and mixing in the second mixer to form a homogeneous molten ink which has a viscosity between about 100 cps and about 1200 cps at a temperature between about 90° C. and about 135° C.

DETAILED DESCRIPTION OF THE INVENTION

The present invention relates to a novel solvent-free, flexographic printing ink which is solid at room temperature and to a method of flexographic printing using this ink in a molten state, e.g., at print temperatures of about 90° C. and higher. As used herein the term "solid" is intended to mean that the physical state of a designated component is solid at ambient room temperature, i.e., the component has a melting point or a softening temperature substantially above ambient room temperature. The solid ink comprises a solid pigment dispersion in a varnish. The solid pigment dispersion comprises a pigment, a solid linear alcohol, one or more dispersants, and typically a solid plasticizer. The varnish comprises a solid, thermoplastic binder and a wax. The solid, thermoplastic binder is an ethylene copolymer or a hydrocarbon resin, and typically has a softening point between about 90° C. or greater. The wax is a highly branched hydrocarbon wax, a polyethylene homopolymer wax, an oxidized polyethylene wax, an animal wax, a vegetable wax, or combinations thereof. The inks of this invention are substantially free of condensation polymers or any other such component which would change the essential character of the ink.

The solid inks are used in melt flexographic printing by heating the ink to a temperature greater than about 90° C. (preferably between about 90° C. and about 135° C.) to form a molten ink which has a viscosity between about 100 cps and about 1200 cps (preferably between about 100 cps and about 700 cps); applying the molten ink to the surface of a heated anilox roller in operational contact with a heated flexographic printing plate; and printing the applied molten ink from the printing plate onto a substrate such as conventional print stock, polymeric films, metal sheets, etc. As used herein the use of the term "in operational contact" is intended to have the conventional meaning that ink applied to the anilox roller is in turn, transferred to the printing surface of the flexographic printing plate.

The flexographic inks of this invention are prepared by first preparing a molten pigment dispersion from a component mixture in a mixer/grinder which is heated to a temperature above the melting point of the component mixture. The component mixture consists essentially of a pigment; a solid linear alcohol at room temperature; and, a dispersing agent; and, optionally, a solid plasticizer. Next, a molten varnish is prepared from a second component mixture in a second mixer which is heated to a temperature above the melting point of the second component mixture. The second component mixture consists essentially of a thermoplastic binder selected from the group consisting of an ethylene copolymer, a hydrocarbon resin, and a combination thereof; and, a wax selected from the group consisting of a highly branched hydrocarbon wax, a polyethylene copolymer wax, an oxidized polyethylene wax, an animal wax, a vegetable wax and combinations thereof. Finally, the pigment dispersion is added to the molten varnish and mixed in the second mixer to form a homogeneous molten ink which has a viscosity between about 100 cps and about 1200 cps at a temperature between about 90° C. and about 135° C. Preferably, the molten ink has a viscosity between about 100 cps and about 700 cps. Typically the homogeneous molten ink is cooled to room temperature to form a solid flexographic printing ink which can be packaged and stored for later use in melt flexographic printing. During this ink preparation, the molten pigment dispersion may be directly added to the molten varnish; or it may be cooled to form a solid pigment dispersion at room temperature for later addition to the molten varnish.

Pigment Dispersion

The pigment dispersion is prepared by first mixing and melting the dispersion components in a suitable heated mixer/grinder to form a melt. Next the pigment is slowly added to the melt while mixing and grinding until the mixture is homogeneous. Typically the dispersion then is collected and allowed to solidify and cool to room temperature. The solid pigment dispersion is then broken into small particles or chips. Alternatively the melt can be maintained in the molten state for direct entry into the varnish.

The pigment dispersion may contain one or more solid pigments. The pigment may be any conventional organic or inorganic pigment such as Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 57:1, Pigment Red 112, Pigment Red 170, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, Pigment Black 7 and the like. White pigments such as titanium dioxide, zinc sulfide, zinc oxide may also be used in the inks of this invention. Pigment compositions which are also useful in the inks of this invention are described in U.S. Pat. Nos. 4,946,508; 4,946,509; 5,024,894; and 5,062,894 each of which is incorporated herein by reference. Such pigment compositions are a blend of the pigment along with a poly(alkylene oxide) grafted pigment.

The pigment dispersion contains one or more solid linear alcohols. The solid linear alcohol functions as dispersing medium during pigment grinding and as a dispersant to maintain a uniform suspension of the ground pigment particles in the ink formulation both in its solid and molten state. Typical linear alcohols are fully saturated, long-chain linear alcohols having a melting point of about 75° C. or greater and a number-average molecular weight (Mn) of about 350 or greater. Preferably the linear alcohols have a $M_n$ between about 350 and about 750; and a melting point between about 75° C. and about 110° C. Solid linear alcohols of this type are Unilin® alcohols which are products of the Baker Petrolite Corp. Unilin® alcohols are fully saturated, long-chain linear alcohols having average carbon chain lengths up to $C_{50}$ with the primary hydroxy function of the alcohol distributed among all of the carbon chain lengths. A particularly preferred solid linear alcohol which is used in the following examples is Unilin® 550 alcohol which has a $M_n$ of 550; a melting point of 99° C.; a hydroxyl number of 83 mg KOH/g sample; and a viscosity at 149° C. of 5.5 cps.

The pigment dispersion contains one or more dispersants. Many conventional pigment dispersants may be used in this invention to prepare the solid pigment dispersion provided that they have substantially no volatile components at press operating temperatures. Preferred dispersants for use in this invention are hyperdispersants. The effectiveness of hyperdispersants is based on their two-part structure which includes one or more anchoring functional group(s) attached to a polymeric solvatable chain. Particularly preferred are the hyperdispersants marketed by Colours & Fine Chemicals division, of ICI Corp., particularly for dispersing pigments and which are used in the following examples, i.e., Solsperse 5000 which is a blue powder having a melting point above 250° C.; Solsperse 17000 which is an amber-brown viscous liquid or waxy paste and which is pourable at 35° C.; and Solsperse 22000 which is a reddish-yellow powder having a melting point at 156° C. As illustrated in the following examples, these hyperdispersants are typically used in combination.

The pigment dispersion may contain one or more solid plasticizers. Typical solid plasticizers include, but are not intended to be limited thereby, solid esters of benzoic acid, phthalic acids and aliphatic/cycloaliphatic acids with melting points above 40° C. and substantially non-volatile at printing press operating temperatures, or combinations thereof. A preferred solid plasticizer is dicyclohexylphthalate.

Solid Flexographic Ink

The solid flexographic ink is prepared by first melting the thermoplastic binders and waxes individually and then the required amounts of these molten materials are poured into a preheated vessel and mixed with a high-speed mixer to make the varnish. The solid pigment dispersion chips, or molten pigment dispersion, are then added to the molten varnish and mixed to form a molten ink which is allowed to cool to room temperature to form the solid flexo ink.

The solid flexographic ink of this invention contains one or more solid thermoplastic binders which has a softening point of about 70° C. The solid thermoplastic binder may be an ethylene copolymer, a hydrocarbon resin or a combination thereof. Preferably the thermoplastic binder is a copolymer of ethylene with either acrylic acid or vinyl acetate. In a preferred embodiment of this invention, the solid thermoplastic binder is poly(ethylene-acrylic acid) which has a Mettler Drop Pt. (ASTM D-3954) of about 90° C. to about 105° C.; a Brookfield viscosity at 140° C. of about 550 cps to about 650 cps; and an acid number between about 40 and about 120. A particularly preferred poly(ethylene-acrylic acid) of this type is A-C® 5120 copolymer of ethylene-acrylic acid which is marketed by Allied Signal Inc., Specialty Chemicals, Morristown N.J. A-C® 5120 copolymer which is used in the following examples, is a poly(ethylene-acrylic acid) which has a Mettler Drop Pt. of 92° C.; a Brookfield viscosity at 140° C. of 650 cps; and an acid number of 120. In an added embodiment of this invention, the vinyl thermoplastic binder is poly(ethylene-vinyl acetate) in which the copolymer contains between about 15 weight % to about 50 weight % of vinyl acetate. Poly(ethylene-vinyl acetate) copolymers of this type have Melt Indexes ranging from about 8 to about 2500 and a softening point (Ring and Ball, ASTM E28 hereinafter identified as "R&B") ranging from about 74° C. to about 150° C. Poly(ethylene-vinyl acetate) copolymers of this type which are used in the following examples are marketed by E. I. duPont deNemours and Co. as Elvax® Ethylene/VA copolymers and by Elf Atochem as Evatane® Ethylene/VA copolymers. In another embodiment of this invention, the solid, thermoplastic binder is a hydrocarbon resin. Typical hydrocarbon resins which are useful in formulating the inks of this invention include but not limited to Escorez 5380 (R&B softening point 85° C.), Escorez 2101 (R&B softening point 94° C.), Escorez 5400 (R&B softening point 100–106° C.), and Escorez 5600 (R&B softening point 100–106° C.).

The solid flexographic ink of this invention contains one or more waxes. The waxes useful in the inks of this invention typically are non-volatile at press operating temperatures and have low melt viscosities. Such waxes or mixture of waxes would provide a proper degree of toughness and flexibility to the printed ink for the intended application. Waxes which are useful in preparing the solid flexographic inks of this invention are selected from the group consisting of a highly branched hydrocarbon wax, a polyethylene homopolymer wax, oxidized polyethylene waxes (such as E-2020 from Baker Petrolite), an animal wax (such as spermaceti wax), a vegetable wax (such as rice bran wax, carnauba wax and candelilla wax), and combinations thereof. Preferred waxes are a highly branched hydrocarbon waxes which typically have a viscosity at 99° C. of about 1 to about 400 cps and preferably a viscosity at 99° C. of about 1 to about 20 cps. A particularly preferred wax of this type is VYBAR® 253 polymer marketed by Baker Petrolite. VYBAR® 253 polymer which is used in the following examples, is a highly branched hydrocarbon which has a number average molecular weight (Mn) of 520 (by vapor pressure osmometry); a softening point (ASTM D36) of about 67° C.; and a viscosity at 99° C. of about 6 cps (ASTM D3236). Another preferred wax is Rosswax 3009 which is marketed by Frank B. Ross Co. Inc., Jersey City, N.J. Rosswax 3009 which is used in the following examples, is a low molecular weight polyethylene derived from high density polyethylene, and has a $M_n$ of 1000–1200; a molecular weight distribution in the range of about 1.0 to about 2.0; a melting point (Drop D-127) of 82° C.–104° C.; and an extremely low melt viscosity. A useful animal wax is spermaceti wax which is a complex cetyl ester mixture. Spermaceti wax used in the following examples has a melting point of 45° C.–49° C.

In a particularly preferred embodiment of this invention, the solid flexographic printing comprises: a pigment; an ethylene-acrylic acid copolymer; a highly branched hydrocarbon wax; a solid linear alcohol at room temperature; one or more hyperdispersant(s); and, dicyclohexylphthalate. Preferably, the ethylene-acrylic acid copolymer is A-C® 5120 copolymer of ethylene-acrylic acid identified above; the highly branched hydrocarbon wax is VYBAR® 253 polymer identified above; the solid linear alcohol is Unilin® 550 alcohol identified above; and the hyperdispersant is the above identified Solsperse 5000; Solsperse 17000; or combinations thereof. The solid inks of this embodiment are particularly useful in hot melt flexographic printing on a variety of substrates giving printed inks with very good adhesion and gloss. In another preferred embodiment of this invention, the solid flexographic printing comprises: a pigment; an ethylene-vinyl acetate copolymer; a polyethylene homopolymer wax; a solid linear alcohol at room temperature; one or more hyperdispersant(s); and, dicyclohexylphthalate. Preferably, the ethylene-vinyl acetate copolymer is Elvax® 40W ethylene-vinyl acetate copolymer (containing 40 wt. % of vinyl acetate, and has a Melt Index of about 52 and a softening point of about 104° C. (ring & ball ASTME28)); the polyethylene homopolymer wax is Rosswax 3009 identified above; the solid linear alcohol is Unilin® 550 alcohol identified above; and, the hyperdispersant is the above identified Solsperse 5000; Solsperse 17000; Solsperse 22000 or combinations thereof. The solid inks of this embodiment are particularly useful in hot melt flexographic printing on a variety of polyester substrates and treated polyethylene substrate giving printed inks with very good adhesion and gloss. Each of the preferred inks has a melting point of about 75° C. or greater, and when heated to a temperature between about 90° C. and about 135° C., forms a molten ink which has a viscosity between about 100 cps and about 1200 cps, and preferably between about 100 cps and about 700 cps.

Hot Melt Flexographic Printing

The solid flexographic inks as prepared herein are used in melt flexographic printing as follows. The solid ink as described above is first broken into small pieces and placed into a heated ink reservoir where it is melted and maintained slightly above its melting point, i.e., to a temperature between about 90° C. and about 135° C. to form a molten ink which has a viscosity between about 100 cps and about 1200 cps. The molten ink is then applied to a heated anilox roller in operational contact with the surface of a heated flexographic printing plate; and then printed from the surface of the flexographic plate onto a substrate. The use of the solid inks of this invention in hot melt flexographic printing is more fully described in the following Examples. The print substrate may be selected from a variety of flexible films and paper such as: polypropylene film with both sides of corona treated; polypropylene film with both sides acrylic coated; polypropylene film with both sides PVDC coated; chemically treated polyester film; corona treated polyester film; PVDC coated polyester film; aluminum foil; and paper products such as coated paper, cardboard, corrugated paper, etc. The substrate may be at room temperature or may be pre-heated before printing, and optionally cooled by chill rollers after printing.

The solid flexo inks of this invention will now be illustrated by the following examples but is not intended to be limited thereby.

In the following examples the process of making the ink was divided in two parts, preparation of a pigment dispersion and preparation of the ink from the pigment dispersion.

The pigment dispersion was made in an oil heated (110° C. to 135° C.) Brabender or Baker-Perkins mixer. The pigment dispersion process temperature depended on the pigment's thermal and dispersion properties. In general, the dispersing components were first mixed and melted for 30 minutes in an oil heated Brabender or Baker-Perkins mixer at 110° C. to 135° C. to form a melt. The dispersing components typically were Unilin 550 alcohol; one or more Solsperse hyperdispersants; and optionally, the solid plasticizer dicyclohexylphthalate (hereinafter DCHP). Next the pigment was slowly added to the melt while mixing and grinding until the mixture was homogeneous. Grinding was continued for 2½ hours and then the dispersion was collected in a metal can or aluminum pan and allowed to solidify and cool to room temperature. The solid pigment dispersion was then broken into small particles or chips.

The solid flexo ink was prepared by first melting the vinyl thermoplastic binders and waxes individually in metal containers at 110° C. The required amounts of these molten materials were then poured into a preheated vessel (120° C.) and mixed with a high-speed mixer to make the varnish. The solid pigment dispersion chips were then added to the molten varnish and mixed for 30 minutes. The molten ink was then poured into an aluminum pan and allowed to cool to room temperature to form the solid flexo ink.

The solid flexo inks as prepared herein were used in melt flexographic printing and evaluated as follows. The solid ink prepared above was first broken into small particles and placed into a heated ink reservoir where it was melted and maintained slightly above its melting point, preferably at a temperature which provided the proper viscosity for printing, i.e., between about 90° C. to about 135° C. The molten ink was then applied to a heated anilox roller and the applied ink is transferred to the printing surface of a flexographic plate. The transferred ink is then printed from the plate surface onto any one of a variety of flexible substrates such as B-523—polypropylene film with both sides of corona treated, 220AB—polypropylene film with both sides acrylic coated, USB-2—polypropylene film with both sides PVDC coated, Melinex 813—chemically treated polyester film, 48 LBT—corona treated polyester film, M-34—PVDC coated polyester film, Aluminum foil, and paper.

In the following examples viscosity was determined at the designated temperature using a Carri-Med AR1000 Rheometer; adhesion was determined using a conventional cross-hatch test with 610 Scotch® tape; and gloss was determined visually.

EXAMPLES 1 AND 2

A blue pigment dispersion was prepared as previously described in an oil heated Brabender mixer at 110° C. using the following materials. The amount of the materials is given as parts-by-weight (hereinafter PBW) based on a 100 parts by weight of the blue pigment dispersion.

| MATERIAL | PBW |
|---|---|
| Unilin 550 alcohol | 32.0 |
| DCHP | 10.0 |
| Solsperse 17000 | 6.0 |
| Solsperse 5000 | 2.0 |
| Pigment Blue 15:4 | 50.0 |

Blue solid inks were prepared as previously described from the blue pigment dispersion and A-C® 5120 copolymer of ethylene-acrylic acid; along with either (Example 1) spermaceti wax having a M.P. 50° C.; or (Example 2) VYBAR® 253 polymer. The amount of the materials used in these examples is given as parts-by-weight based on 100 parts by weight of the resulting solid blue inks.

| MATERIAL | Ex. 1 | Ex. 2 |
|---|---|---|
| Blue Pigment Dispersion | 25.0 | 25.0 |
| A-C-5120 | 50.0 | 50.0 |
| Spermaceti wax | 25.0 | — |
| VYBAR ® 253 polymer | — | 25.0 |

When heated to 120° C. the resulting molten ink prepared with Spermaceti wax (Example 1) had a viscosity of 205 cps (centipoises); and the resulting molten ink prepared with VYBAR® 253 polymer (Example 2) had a viscosity of 229 cps.

The solid blue inks were used in melt flexographic printing to print a variety of substrates and evaluated as previously described. The gloss of the resulting printed ink prepared with Spermaceti wax (Example 1) was good; and the gloss of the resulting printed ink prepared with VYBAR® 253 polymer (Example 2) was very good. The adhesion of each printed ink to each of the substrates is as follows:

| SUBSTRATE | Ex. 1 | Ex. 2 |
|---|---|---|
| B-523 | V. Good | V. Good |
| 220AB | Poor | V. Good |
| USB-2 | Poor | V. Good |
| Melinex-813 | Poor | V. Good |
| 48LBT | Poor | V. Good |
| Coated Paper | Good | V. Good |
| Aluminum foil | Poor | V. Good |

The hot melt inks of Example 1 based on ethylene acrylic acid and spermaceti wax printed on coated paper gave good adhesion; and when printed on corona treated polypropylene film, the printed ink had very good adhesion to the film. The hot melt inks of Example 2 based on ethylene acrylic acid and VYBAR® 253 polymer when printed had very good adhesion to all of the substrates.

EXAMPLES 3

Blue (BLU), red (RED), yellow (YEL) and black (BLK) pigment dispersions were prepared as previously described in an oil heated Brabender mixer at 110° C. using the following materials. The amount of the materials is given as parts-by-weight (hereinafter PBW) based on a100 parts by weight of each pigment dispersion.

| MATERIAL | BLU | RED | YEL | BLK |
|---|---|---|---|---|
| Unilin 550 alcohol | 32.0 | 35.0 | 32.3 | 25.0 |
| DCHP | 10.0 | — | 5.0 | 5.0 |
| Solsperse 17000 | 6.0 | 15.0 | 7.4 | 10.0 |
| Solsperse 5000 | 2.0 | — | — | 2.0 |
| Solsperse 22000 | — | — | 5.3 | — |
| Pigment Blue 15:4 | 50.0 | — | — | — |
| Pigment Red 57:1 | — | 50.0 | — | — |
| Pigment Yellow 14 | — | — | 50.0 | — |
| Black Pigment[a] | — | — | — | 58.0 |

[a]Black Pigment is Special Black 250, Degussa Corp., Teterboro, NJ.

Blue (BLU1), red (RED1), yellow (YEL1) and black (BLK1) solid inks were prepared as previously described from 25 parts by weight of each respective pigment dispersion and 25 parts by weight each of Elvax® 140W (Elvax® 140W is a copolymer of ethylene-vinyl acetate containing 33 wt. % of vinyl acetate, and has a Melt Index of 400 and a softening point of 74° C. (ring & ball ASTME28)); along with 50 parts by weight each of Rosswax 3009 polyethylene wax. (The amount of the materials used in each ink is given as parts-by-weight based on 100 parts by weight of each resulting solid ink).

Each solid ink was used in melt flexographic printing to print a variety of substrates and evaluated as previously described. In the following table, the melting point (M.P. in ° C.) and melt viscosity at 120° C. (in cps) is given for each of the inks as measured with a Carri-Med AR 1000 Rheometer; along with the color strength development and gloss of each resulting printed ink.

| PROPERTY | BLU1 | RED1 | YEL1 | BLK1 |
|---|---|---|---|---|
| M.P. (° C.) | 83 | 83 | — | 82 |
| Viscosity @ 120° C. (cps) | 354 | 398 | 585 | 423 |
| Color Strength | V. Good | V. Good | V. Good | Good |
| Gloss | V. Good | V. Good | V. Good | V. Good |

The adhesion of each printed ink to each of the substrates is as follows:

| SUBSTRATE | BLU1 | RED1 | YEL1 | BLK1 |
|---|---|---|---|---|
| B-523 | Poor | Poor | Poor | Poor |
| 48LBT | Good | Good | Good | Good |
| M-34 | V. Good | V. Good | V. Good | V. Good |
| Melinex-813 | Good | Good | Good | Good |

The printed hot melt inks of this example generally had very good color strength development and very good gloss. The adhesion of the printed inks to PVDC coated (M-34) polyester film was very good and adhesion to corona treated (48LBT) or chemically treated (Melinex-813) polyester film was good.

EXAMPLES 4

Blue (BLU), red (RED), yellow (YEL) and black (BLK) pigment dispersions were prepared as previously described in Example 3.

Blue (BLU2), red (RED2), and yellow (YEL2) and black (BLK2) solid inks were prepared as previously described from 25 parts by weight of each respective pigment dispersion and 25 parts by weight each of Elvax® 140W (Elvax® 140W is a copolymer of ethylene-vinyl acetate containing 33 wt. % of vinyl acetate, and has a Melt Index of 400 and a softening point of 74° C. (ring & ball ASTME28)); along with 50 parts by weight each of Spermaceti wax having a M.P. of 50° C. Black (BLK2) solid ink was prepared as previously described from 25 parts by weight of pigment dispersion and 25 parts by weight of Elvax® 140W; along with 50 parts by weight of the Spermaceti wax. (The amount of the materials used in each ink is given as parts-by-weight based on 100 parts by weight of each resulting solid ink.

Each solid ink was used in melt flexographic printing to print a variety of substrates and evaluated as previously described. In the following table, the melting point (M.P. in ° C.) and melt viscosity at 120° C. (in cps) is given for each of the inks as measured with a Carri-Med AR 1000 Rheometer; along with the color strength development and gloss of each resulting printed ink.

| PROPERTY | BLU2 | RED2 | YEL2 | BLK2 |
|---|---|---|---|---|
| M.P. (° C.) | 83 | 83 | 83 | — |
| Viscosity @ 120° C. (cps) | 377 | 545 | 427 | 750 |
| Color Strength | V. Good | V. Good | V. Good | Fair |
| Gloss | V. Good | V. Good | V. Good | V. Good |

The adhesion of each printed ink to each of the substrates is as follows:

| SUBSTRATE | BLU2 | RED2 | YEL2 | BLK2 |
| --- | --- | --- | --- | --- |
| B-523 | Good | Good | Good | Poor |
| 48LBT | Poor | Poor | Poor | Poor |
| M-34 | Poor | Poor | Poor | Poor |
| Melinex-813 | Poor | Poor | Poor | Poor |

The printed hot melt inks of this example generally had very good color strength development and very good gloss.

Each solid ink was used in melt flexographic printing to print a variety of substrates and evaluated as previously described. In TABLE II, the melt viscosity at 100° C. (in cps) is given for each of the inks as measured with a Carri-Med AR1000 Rheometer; along with the color strength development and gloss of each resulting printed ink. Also noted is the temperature in "° C." at which the ink produced smoke.

The adhesion of each printed ink to each of the substrates is described in TABLE III.

TABLE I

| MATERIAL | BLU3 | BLU4 | BLU5 | BLU6 | BLU7 | BLU8 | BLU9 | BLU10 |
| --- | --- | --- | --- | --- | --- | --- | --- | --- |
| BLU Dispersion | 30 | 25 | 25 | 30 | 30 | 25 | 30.00 | 30.00 |
| Rosswax 3009 | 45 | 40 | 30 | 45 | 45 | 35 | 45.00 | 45.00 |
| Elvax 40W | 25 | — | — | — | — | — | — | — |
| Elvax 200W | — | 35 | 45 | — | — | — | — | — |
| Evatane 28-05 | — | — | — | 25 | — | — | — | — |
| Evatane 28-420 | — | — | — | — | 25 | 35 | 45.00 | 45.00 |

TABLE II

| PROPERTY | BLU3 | BLU4 | BLU5 | BLU6 | BLU7 | BLU8 | BLU9 | BLU10 |
| --- | --- | --- | --- | --- | --- | --- | --- | --- |
| Viscosity | 480–750 | <480 | <480 | <480 | — | — | — | — |
| Color Strength | Good | Fair | Fair | Good | Fair | Fair | Good | Good |
| Gloss | Good | Poor | Poor | V.Good | Fair | Fair | Fair | Fair |

TABLE III

| SUBSTRATE | BLU3 | BLU4 | BLU5 | BLU6 | BLU7 | BLU8 | BLU9 | BLU10 |
| --- | --- | --- | --- | --- | --- | --- | --- | --- |
| B-523 | V.Good | Poor | Poor | Poor | Poor | Poor | Poor | Poor |
| 48LBT | V.Good | Poor | Poor | Poor | Poor | Poor | Fair | Good |
| M-34 | V.Good | Poor | Fair | Good | Fair | Good | Fair | Good |
| Melinex 813 | V.Good | Poor | Fair | Poor | Poor | Poor | Fair | Good |

The adhesion of the printed inks to corona treated polypropylene film was generally good.

EXAMPLES 5

A Blue (BLU) pigment dispersion was prepared as previously described in Example 3.

A series of Blue (BLU3-BLU10) solid inks was prepared as previously described from the Blue (BLU) pigment dispersion of Example 3; Rosswax 3009 polyethylene wax; and a ethylene-vinyl acetate copolymer selected from the group Elvax® 40W; Elvax® 200W; Evatane® 28-05; and Evatane® 28-420. Elvax® 40W is a copolymer of ethylene-vinyl acetate containing 40 wt. % of vinyl acetate, and has a Melt Index of 52 and a softening point of 104° C. (ring & ball ASTME28). Elvax® 200W is a copolymer of ethylene-vinyl acetate containing 28 wt. % of vinyl acetate, and has a Melt Index of 2500 and a softening point of 81° C. (ring & ball ASTME28). Evatane® 28-05 is a copolymer of ethylene-vinyl acetate containing 27–29 wt. % of vinyl acetate, and has a Melt Index of 5 to 8 and a melting point of 73° C. Evatane® 28-420 is a copolymer of ethylene-vinyl acetate containing 27–29 wt. % of vinyl acetate, and has a Melt Index of 370–470 and a melting point of 67° C. The amount of the materials used in each ink is given in TABLE I as parts-by-weight based on 100 parts by weight of each resulting solid ink.

Of the printed hot melt inks of this example, BLU3 containing the polyethylene-vinyl acetate copolymer, with 40 wt. % vinyl acetate (Elvax 40W), had the best adhesion to each of the substrates; had good color strength and gloss; and had a viscosity in the acceptable range for flexography. Inks based on Elvax 40W tended to smoke (i.e., emit volatile components) in the temperature range of 110–115° C.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A solvent-free, flexographic printing ink which is solid at room temperature, the ink consisting essentially of:
   (A) a pigment;
   (B) a thermoplastic binder selected from the group consisting of an ethylene copolymer, a hydrocarbon resin, and a combination thereof;
   (C) a wax selected from the group consisting of a highly branched hydrocarbon wax, a polyethylene homopolymer wax, an oxidized polyethylene wax, an animal wax, a vegetable wax and combinations thereof;
   (D) a solid linear alcohol at room temperature; and,
   (E) a dispersing agent; and, optionally,
   (F) a solid plasticizer;

wherein, the ink has a melting point of about 75° C. or greater, and when heated to a temperature between about 90° C. and about 135° C., forms a molten ink which has a viscosity between about 100 cps and about 1200 cps.

2. The ink of claim 1 wherein the molten ink has a viscosity between about 100 cps and about 700 cps.

3. The ink of claim 1 wherein the thermoplastic binder is the ethylene copolymer.

4. The ink of claim 3 wherein the ethylene copolymer is selected from the group consisting of an ethylene-acrylic acid copolymer; an ethylene-vinyl acetate copolymer; and a combination thereof.

5. The ink of claim 4 wherein the ethylene copolymer is the ethylene-acrylic acid copolymer.

6. The ink of claim 5 wherein the ethylene-acrylic acid copolymer has an acid number of about 40 and about 120 and a Brookfield viscosity at 140° C. of about 100 cps to about 1000 cps.

7. The ink of claim 6 wherein the ethylene-acrylic acid copolymer has an acid number of about 120 and a Brookfield viscosity at 140° C. of about 650 cps.

8. The ink of claim 4 wherein the ethylene copolymer is the ethylene-vinyl acetate copolymer.

9. The ink of claim 8 wherein the ethylene-vinyl acetate copolymer contains between about 15 weight % to about 50 weight % of vinyl acetate.

10. The ink of claim 9 wherein the ethylene vinyl acetate copolymer contains about weight 40% of vinyl acetate and a Melt Index of about 52.

11. The ink of claim 1 wherein the wax is the highly branched hydrocarbon wax.

12. The ink of claim 11 wherein the highly branched hydrocarbon wax has a number average molecular weight (Mn) of about 520; a softening point of about 67° C.; and a viscosity at 99° C. of about 6 cps.

13. The ink of claim 1 wherein the wax is the polyethylene homopolymer wax.

14. The ink of claim 13 wherein the polyethylene homopolymer wax is polyethylene having a number average molecular weight (Mn) of about 1000–1200, a molecular weight distribution of about 1 to about 2 and a melting point of about 82° C. to about 104° C.

15. The ink of claim 14 wherein the molecular weight distribution of 1.2 to 1.5.

16. The ink of claim 1 wherein the wax is the animal wax.

17. The ink of claim 16 wherein the animal wax is a spermaceti wax.

18. The ink of claim 1 wherein the solid linear alcohol is a fully saturated, long-chain linear alcohol having a melting point of about 75° C. or greater and a number-average molecular weight (Mn) of about 350 or greater.

19. The ink of claim 18 wherein the linear alcohol has a $M_n$ between about 350 and about 750; and a melting point between about 75° C. and about 110° C.

20. The ink of claim 18 wherein the linear alcohol has a $M_n$ of about 550; a melting point of about 99° C.; a hydroxyl number of about 83; and a viscosity at 149° C. of about 5.5 cps.

21. The ink of claim 1 wherein the dispersing agent is one or more solid or paste hyperdispersant(s).

22. The ink of claim 1 wherein the ink contains the solid plasticizer.

23. The ink of claim 22 wherein the solid plasticizer is dicyclohexylphthalate.

24. A solvent-free, flexographic printing ink which is solid at room temperature, the ink comprising:

(A) a pigment;
(B) an ethylene-acrylic acid copolymer;
(C) a highly branched hydrocarbon wax;
(D) a solid linear alcohol at room temperature;
(E) one or more hyperdispersant(s); and,
(F) a dicyclohexylphthalate;
wherein, the ink has a melting point of about 75° C. or greater, and when heated to a temperature between about 90° C. and about 135° C., forms a molten ink which has a viscosity between about 100 cps and about 1200 cps.

25. The ink of claim 24 wherein the molten ink has a viscosity between about 100 cps and about 700 cps.

26. A solvent-free, flexographic printing ink which is solid at room temperature, the ink comprising:

(A) a pigment;
(B) an ethylene-vinyl acetate copolymer;
(C) a polyethylene homopolymer wax;
(D) a solid linear alcohol at room temperature;
(E) one or more hyperdispersant(s); and,
(F) a dicyclohexylphthalate;
wherein, the ink has a melting point of about 75° C. or greater, and when heated to a temperature between about 90° C. and about 135° C., forms a molten ink which has a viscosity between about 100 cps and about 1200 cps.

27. The ink of claim 26 wherein the molten ink has a viscosity between about 100 cps and about 700 cps.

28. A method of melt flexographic printing comprising:

(I) providing an ink which is solid at room temperature, the ink consisting essentially of:
  (A) a pigment;
  (B) a thermoplastic binder selected from the group consisting of an ethylene copolymer, a hydrocarbon resin, and a combination thereof;
  (C) a wax selected from the group consisting of a highly branched hydrocarbon wax, a polyethylene homopolymer wax, an oxidized polyethylene wax, an animal wax, a vegetable wax and combinations thereof;
  (D) a solid linear alcohol at room temperature; and,
  (E) a dispersing agent; and, optionally,
  (F) a solid plasticizer;
(II) heating the ink to a temperature between about 90° C. and about 135° C. to form a molten ink which has a viscosity between about 100 cps and about 1200 cps;
(III) applying the molten ink to a heated anilox roller in operational contact with a surface of a heated flexographic printing plate; and
(IV) printing the applied molten ink onto a substrate.

29. The method of claim 28 wherein the molten ink has a viscosity between about 100 cps and about 700 cps.

30. The method of claim 28 wherein the substrate is heated prior to printing.

31. The method of claim 30 wherein the substrate is cooled after printing.

32. A method for preparing a flexographic printing ink for hot melt flexographic printing comprising:

(I) preparing a molten pigment dispersion from a component mixture in a mixer/grinder which is heated to a temperature above the melting point of the component mixture, wherein the component mixture consists essentially of:
  (A) a pigment;

(B) a solid linear alcohol at room temperature; and,
(C) a dispersing agent; and, optionally,
(D) a solid plasticizer;

(II) preparing a molten varnish from a second component mixture in a second mixer which is heated to a temperature above the melting point of the second component mixture, wherein the second component mixture consists essentially of:
(E) a thermoplastic binder selected from the group consisting of an ethylene copolymer, a hydrocarbon resin, and a combination thereof; and,
(F) a wax selected from the group consisting of a highly branched hydrocarbon wax, a polyethylene homopolymer wax, an oxidized polyethylene wax, an animal wax, a vegetable wax and combinations thereof; and (III) adding the pigment dispersion to the molten varnish and mixing in the second mixer to form a homogeneous molten ink which has a viscosity between about 100 cps and about 1200 cps at a temperature between about 90° C. and about 135° C.

33. The method of claim 32 wherein the molten ink has a viscosity between about 100 cps and about 700 cps.

34. The method of claim 32 wherein the homogeneous molten ink is cooled to room temperature to form a solid flexographic printing ink.

35. The method of claim 32 wherein the molten pigment dispersion is cooled to form a solid pigment dispersion at room temperature prior step (III).

* * * * *